United States Patent
Ido et al.

(10) Patent No.: US 9,023,453 B2
(45) Date of Patent: *May 5, 2015

(54) HONEYCOMB STRUCTURE AND METHOD FOR MANUFACTURING HONEYCOMB STRUCTURE

(75) Inventors: Takahiko Ido, Ibi-Gun (JP); Yoshihiro Koga, Ibi-Gun (JP); Takumi Asanuma, Ibi-Gun (JP); Takashi Ito, Ibi-Gun (JP)

(73) Assignee: Ibiden Co., Ltd., Ogaki-shi (JP)

( * ) Notice: Subject to any disclaimer, the term of this patent is extended or adjusted under 35 U.S.C. 154(b) by 823 days.

This patent is subject to a terminal disclaimer.

(21) Appl. No.: 13/022,544

(22) Filed: Feb. 7, 2011

(65) Prior Publication Data
US 2011/0250382 A1    Oct. 13, 2011

(30) Foreign Application Priority Data
Apr. 9, 2010    (WO) .................. PCT/JP2010/056478

(51) Int. Cl.
  *C04B 35/565*    (2006.01)
  *B01D 46/24*    (2006.01)
  (Continued)

(52) U.S. Cl.
  CPC ........... *C04B 35/565* (2013.01); *F01N 2330/60* (2013.01); *C04B 41/5071* (2013.01); *C04B 41/5096* (2013.01); *B01D 2046/2433* (2013.01); *B01D 46/2425* (2013.01); *B01J 35/04* (2013.01); *C04B 38/0009* (2013.01); *C04B 38/0019* (2013.01); *C04B 38/0074* (2013.01); *C04B 2235/3873* (2013.01); *C04B 2235/3891* (2013.01); *C04B 2235/428* (2013.01);
  (Continued)

(58) Field of Classification Search
  CPC ............. C04B 2237/68; C04B 35/565; B01D 46/2425; F01N 3/2026; F01N 3/24; F01N 3/2828
  USPC ........ 428/116; 219/78.11, 553; 422/169–172, 422/174, 177–182; 55/522–524; 60/300; 501/88, 92
  See application file for complete search history.

(56) References Cited

U.S. PATENT DOCUMENTS 5,569,455 A    10/1996   Fukui et al.
5,588,292 A *  12/1996   Hiraishi et al. .................. 60/300
(Continued)

FOREIGN PATENT DOCUMENTS

EP    2221460    8/2010
FR    2921847    4/2009
(Continued)

OTHER PUBLICATIONS

"Cordierite". Datasheet. Found at <http://www.matweb.com/>.*
(Continued)

*Primary Examiner* — David Sample
*Assistant Examiner* — Nicholas W Jordon
(74) *Attorney, Agent, or Firm* — Mori & Ward, LLP

(57) ABSTRACT

A honeycomb structure includes at least one pillar-shaped honeycomb unit and a pair of electrodes. The pillar-shaped honeycomb unit includes an outer peripheral wall and cell walls. The cell walls extend along a longitudinal direction of the honeycomb unit to define cells. The cell walls are composed of a ceramic aggregate having pores. The cell walls contain a substance having an electrical resistivity lower than an electrical resistivity of ceramic forming the ceramic aggregate. The pair of electrodes is arranged at the cell walls and/or the outer peripheral wall.

29 Claims, 5 Drawing Sheets

(51) Int. Cl.
  *C04B 41/50* (2006.01)
  *B01J 35/04* (2006.01)
  *C04B 38/00* (2006.01)
  *F01N 3/20* (2006.01)
  *F01N 3/28* (2006.01)
  *C04B 35/634* (2006.01)
  *C04B 35/636* (2006.01)
  *C04B 37/00* (2006.01)

(52) U.S. Cl.
  CPC ..... C04B2235/483 (2013.01); *C04B 2235/616* (2013.01); *C04B 2235/656* (2013.01); *C04B 2235/66* (2013.01); *F01N 3/2026* (2013.01); *F01N 3/2828* (2013.01); F01N 2370/04 (2013.01); F01N 2450/28 (2013.01); Y02T 10/26 (2013.01); *C04B 35/63416* (2013.01); *C04B 35/6365* (2013.01); C04B 2235/522 (2013.01); C04B 2235/5224 (2013.01); C04B 2235/5228 (2013.01); C04B 2235/5232 (2013.01); C04B 2235/5244 (2013.01); C04B 2237/083 (2013.01); C04B 2237/09 (2013.01); C04B 2237/54 (2013.01); C04B 2237/68 (2013.01); C04B 2237/708 (2013.01); *C04B 37/005* (2013.01)

(56) References Cited

U.S. PATENT DOCUMENTS

| | | | |
|---|---|---|---|
| 5,733,352 A * | 3/1998 | Ogawa et al. | 55/523 |
| 8,112,989 B1 * | 2/2012 | Phelps et al. | 422/180 |
| 8,435,455 B2 * | 5/2013 | Ido et al. | 422/174 |
| 2005/0159310 A1 | 7/2005 | Ohno et al. | |
| 2009/0176043 A1 * | 7/2009 | Tomita et al. | 428/116 |
| 2010/0308849 A1 * | 12/2010 | Bouteiller et al. | 324/700 |
| 2012/0248090 A1 * | 10/2012 | Furukawa et al. | 219/538 |

FOREIGN PATENT DOCUMENTS

| | | |
|---|---|---|
| JP | 49-124412 U | 10/1974 |
| JP | 8-141408 | 6/1996 |
| JP | 9-71466 | 3/1997 |
| JP | 09088566 | 3/1997 |
| JP | 2005-7360 | 1/2005 |
| WO | WO 2011/043434 | 4/2011 |

OTHER PUBLICATIONS

"Molybdenum Disilicide, MoSi2". Datasheet. Found at <http://www.matweb.com/>.*

"Typical Silicon Carbide (SiC) Properties", no date, found at <http://www.ferroceramic.com/>.*

Extended European Search Report for corresponding EP Application No. 10194127.6-2111, Jul. 14, 2011.

* cited by examiner

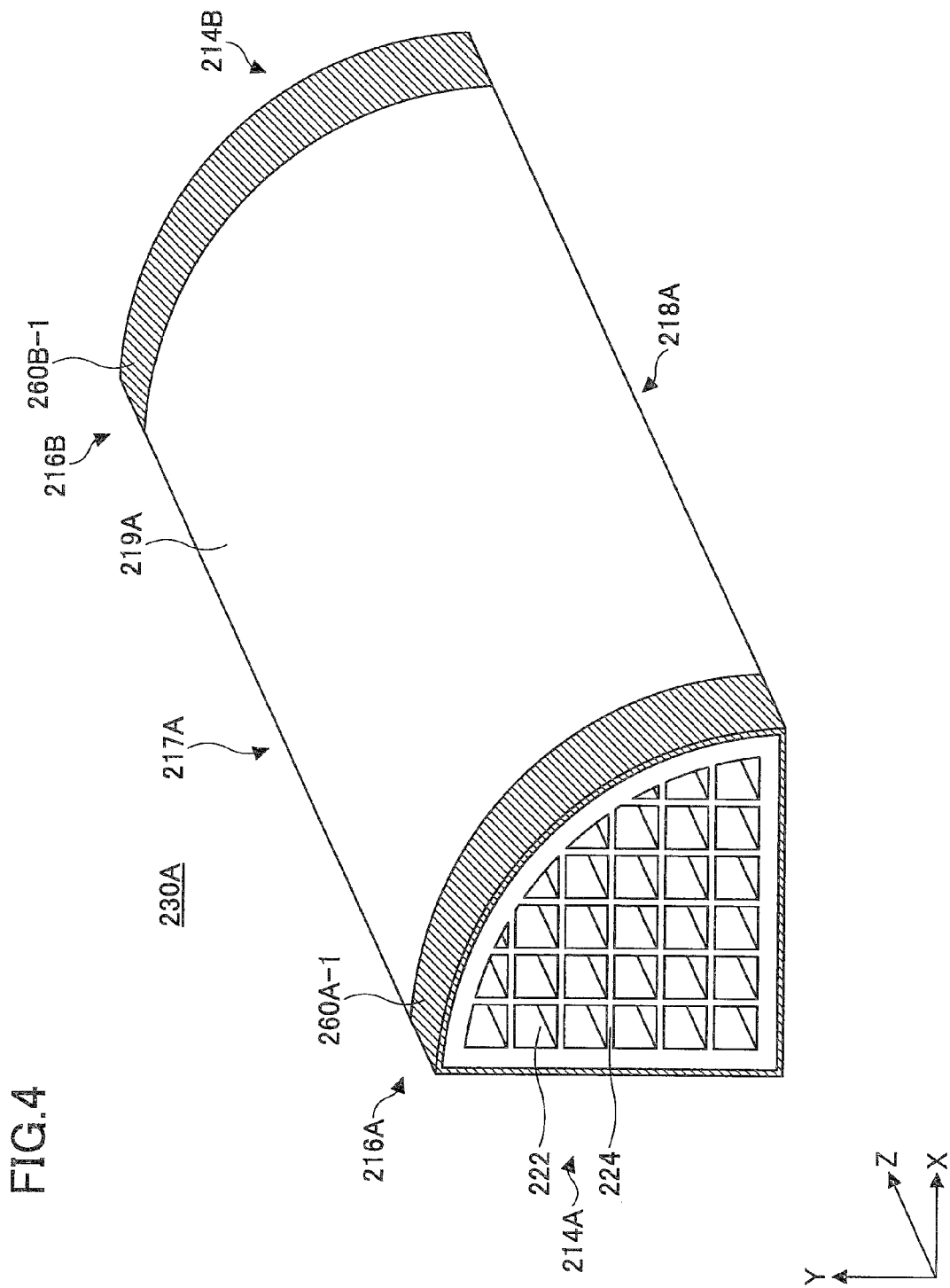

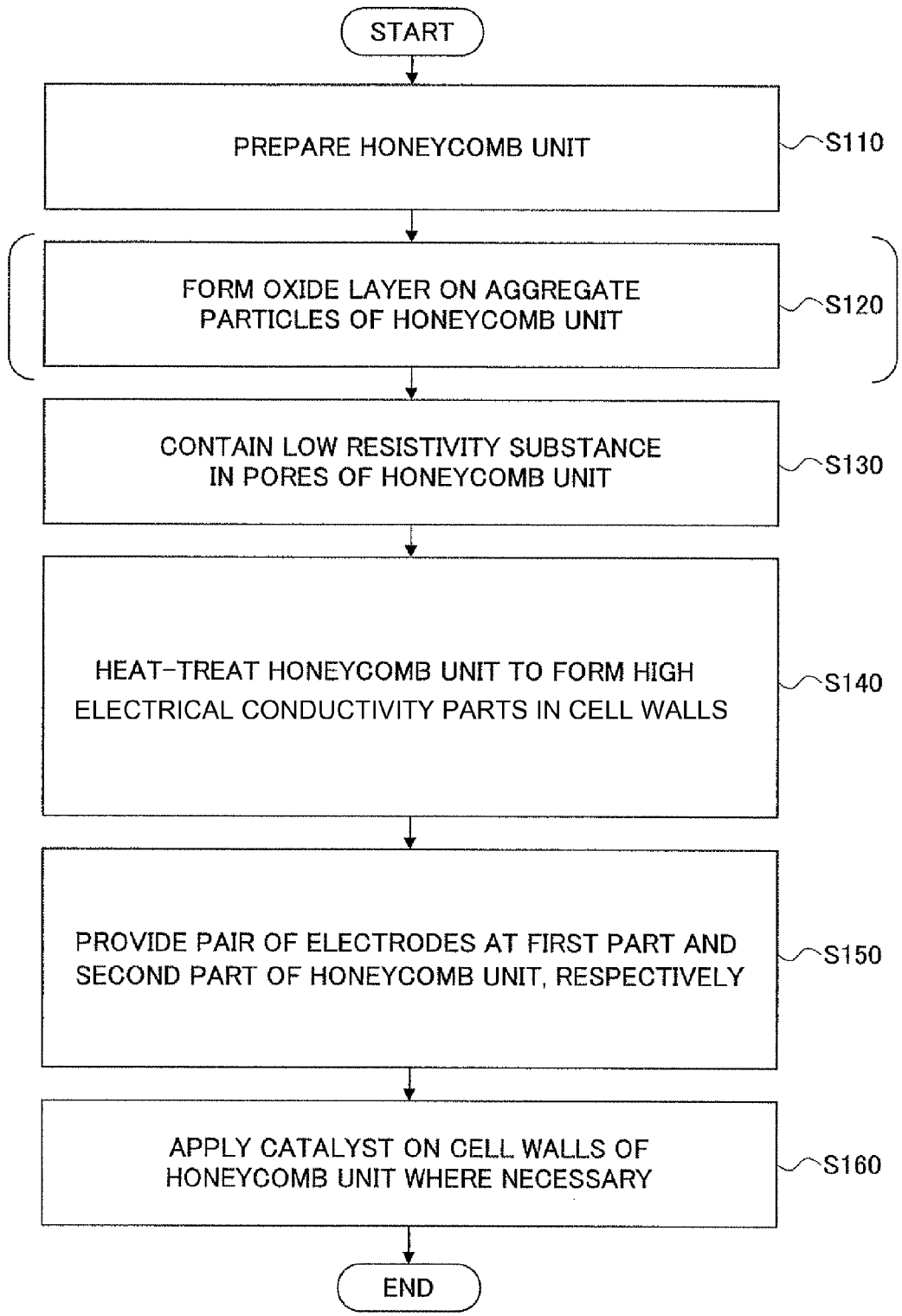

HONEYCOMB STRUCTURE AND METHOD FOR MANUFACTURING HONEYCOMB STRUCTURE

CROSS-REFERENCE TO RELATED APPLICATION

The present application claims priority under 35 U.S.C §119 to International Application No. PCT/JP2010/056478 filed on Apr. 9, 2010, the entire contents of which are incorporated by reference herein.

BACKGROUND OF THE INVENTION

1. Field of the Invention

The present invention relates to a honeycomb structure and a method for manufacturing the honeycomb structure.

2. Discussion of Background

Many technologies have been developed for converting exhaust gases from automobiles. However, due to an increase in traffic, it is hard to say that countermeasures for controlling exhaust gases have been satisfactorily taken. Meanwhile, restrictions on exhaust gases from automobiles will be further strengthened domestically and worldwide.

In order to harmonize with such restrictions, catalyst carriers capable of processing predetermined components contained in exhaust gas have been used in exhaust gas systems. Further, as members of such catalyst carriers, honeycomb structures have been used.

Such honeycomb structures have plural cells (through-holes) extending from one end face to the other end face along its longitudinal direction, and the cells are separated from one another by cell walls on which a catalyst is carried. Therefore, when exhaust gas is caused to pass through such honeycomb structures, the catalyst carried on the cell walls converts (oxidizes and reduces) substances such as HC (hydrocarbon compounds), CO (carbon monooxide), and NOx (nitrogen oxide) contained in the exhaust gas. Consequently, such components in the exhaust gas can be processed.

Generally, the cell walls (substrates) of such honeycomb structures are made of cordierite. Further, the cell walls have a catalyst carrying layer made of γ-alumina, and a precious metal catalyst such as platinum and/or rhodium is carried on the catalyst carrying layer.

Further, in order to enhance conversion performance at an exhaust gas temperature lower than a temperature at which a catalyst becomes active, there has been proposed a technology for providing a honeycomb structure having relatively low resistance with electrodes for applying voltage and energizing the same so as to cause the honeycomb structure to heat by itself (JP-U-49-124412).

The contents of JP-U-49-124412 are incorporated by reference herein.

SUMMARY OF THE INVENTION

According to one aspect of the present invention, a honeycomb structure includes at least one pillar-shaped honeycomb unit and a pair of electrodes. The pillar-shaped honeycomb unit includes an outer peripheral wall and cell walls. The cell walls extend along a longitudinal direction of the honeycomb unit to define cells. The cell walls are composed of a ceramic aggregate having pores. The cell walls contain a substance having an electrical resistivity lower than an electrical resistivity of ceramic forming the ceramic aggregate. The pair of electrodes is arranged at the cell walls and/or the outer peripheral wall.

According to another aspect of the present invention, a method for manufacturing a honeycomb structure including at least one pillar-shaped honeycomb unit includes preparing the honeycomb unit as aggregate. The honeycomb unit includes cell walls extending along a longitudinal direction of the honeycomb unit to define cells. A substance having an electrical resistivity lower than an electrical resistivity of ceramic forming the aggregate is contained into the cell walls of the honeycomb unit as the aggregate. The honeycomb unit as the aggregate is heat-treated. A pair of electrodes is provided at the honeycomb unit as the aggregate.

BRIEF DESCRIPTION OF THE DRAWINGS

Other objects, features and advantages of the present invention will become more apparent from the following detailed description when read in conjunction with the accompanying drawings, in which:

FIG. 4 is a perspective view schematically showing an example of a honeycomb unit constituting the honeycomb structure shown in FIG. 3; and FIG. 5 is a flowchart schematically showing an example of a method for manufacturing the honeycomb structure according to the embodiment of the present invention.

DESCRIPTION OF THE EMBODIMENTS

Figure 1:
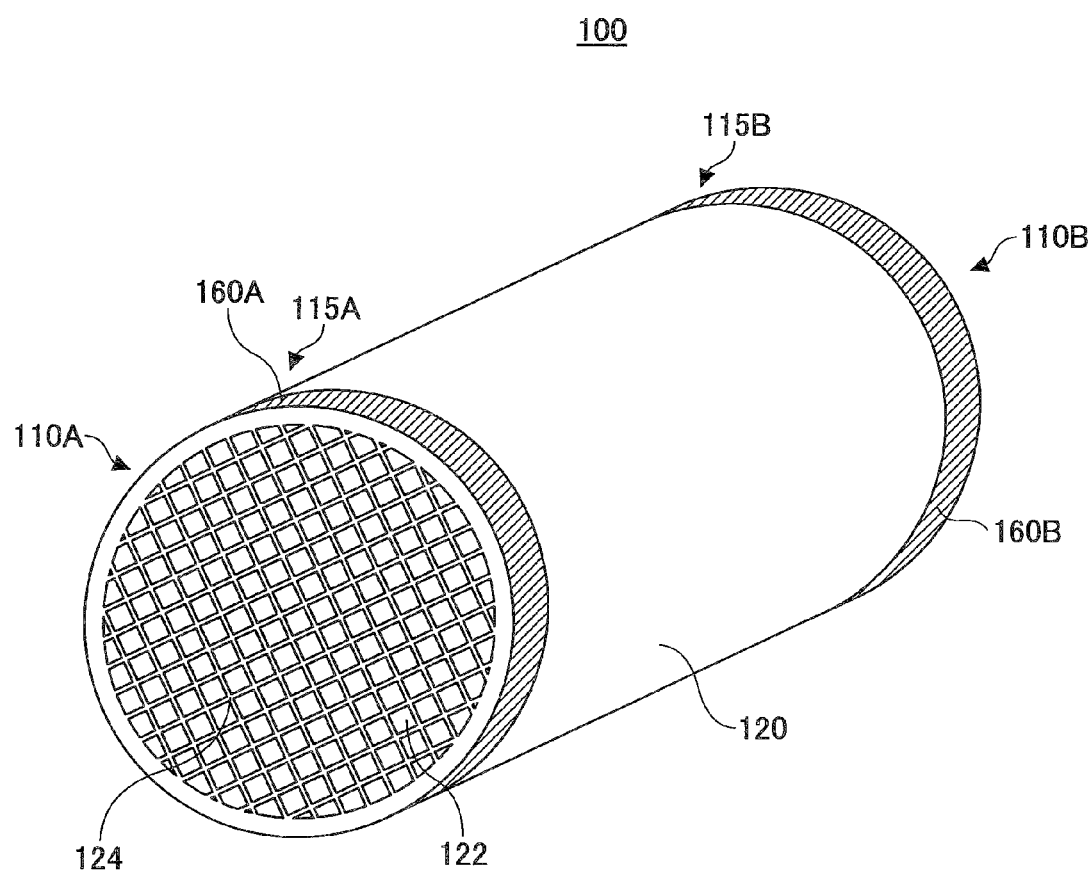
FIG. 1 is a perspective view schematically showing an example of a honeycomb structure according to an embodiment of the present invention.

The conventional honeycomb structure described in JP-U-49-124412 is energized through the electrodes as described above so that it can be heated due to the resistance.

However, the electrical resistivity of a resistor generally represents a function of temperature, and is likely to vary with the temperature. Accordingly, in the conventional honeycomb structure described in JP-U-49-124412 as well, an electrical resistivity varies with temperature, and in particular, it appears to rapidly decrease as the temperature rises.

On the other hand, when the honeycomb structure is used as an exhaust-gas conversion apparatus, the temperature of the honeycomb structure varies in a wide range between room temperature and about 500° C. Accordingly, even if the honeycomb structure has an appropriate electrical resistivity in a temperature range, the electrical resistivity varies as the temperature of the honeycomb structure varies and thus becomes inappropriate. For example, where the honeycomb structure has an appropriate electrical resistivity in a temperature range, it appears that the electrical resistivity decreases as the temperature of the honeycomb structure rises and thus becomes inappropriate. In this case also, it becomes difficult to apply appropriate heat to the honeycomb structure, i.e., set the honeycomb structure at a certain temperature within a predetermined time.

According to an embodiment of the present invention, it is possible to obtain a honeycomb structure capable of more easily suppressing the dependency of electrical resistivity on a temperature variation than before.

Next, the embodiment of the present invention is described with reference to the accompanying drawings, wherein like reference numerals designate corresponding or identical elements throughout the various drawings.

In the embodiment of the present invention, a honeycomb, which is composed of a ceramic aggregate and cell walls formed by the aggregate and including pores, is referred to as a "honeycomb unit as aggregate" or simply referred to as a "honeycomb unit." Further, a honeycomb, which contains a substance having an electrical resistivity lower than that of ceramic forming the aggregate in the cell walls of the honeycomb unit as aggregate, is referred to as a "conductive honeycomb." Further, the substance having the electrical resistivity lower than that of the ceramic forming the aggregate of the cell walls of the honeycomb unit as aggregate is referred to as a "low resistivity substance."

(First Configuration)

Figure 2:
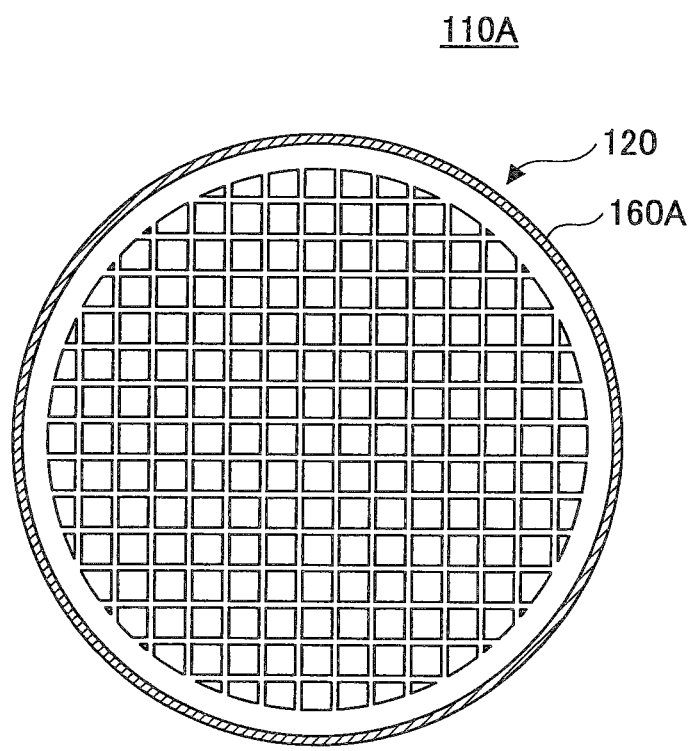
FIG. 2 is a top view of an end face of the honeycomb structure shown in FIG. 1.

FIG. 1 schematically shows a honeycomb structure according to the embodiment of the present invention. Further, FIG. 2 is a top view of an end face of the honeycomb structure 100 shown in FIG. 1.

As shown in FIG. 1, the honeycomb structure 100 according to the embodiment of the present invention is composed of the conductive honeycomb and a pair of electrodes 160A and 160B formed at a lateral face on the sides of the end faces of the conductive honeycomb. The conductive honeycomb has the two open end faces 110A and 110B and the lateral face 120. Further, the conductive honeycomb has plural cells (through-holes) 122 and cell walls 124 that separate the cells 122 from one another. The cells 122 extend from the end face 110A to the end face 110B along the longitudinal direction of the conductive honeycomb, and are open at the end faces 110A and 110B.

The electrodes 160A and 160B are provided at the peripheries (which are hereinafter referred to as an "end part 115A of the conductive honeycomb" and an "end part 115B of the conductive honeycomb") of the end faces 110A and 110B of the conductive honeycomb, respectively (also see FIG. 2).

The aggregate of the honeycomb unit is made of a material with a substance having a high electrical resistivity like, for example, SiC as a main ingredient. A catalyst is carried on the cell walls 124 of the honeycomb structure 100.

The electrodes 160A and 160B are made of a conductive material like, for example, metal. A method for forming the electrodes 160A and 160B is not particularly limited. The electrodes 160A and 160B are provided at the end parts 115A and 115B of the conductive honeycomb by metal spraying, metal sputtering, metal vapor deposition, or the like. The electrodes may be provided at parts other than end parts of the conductive honeycomb.

The characteristic of the honeycomb structure 100 according to the embodiment of the present invention is that the honeycomb structure 100 is composed of the conductive honeycomb in which the cell walls of the honeycomb unit as aggregate ranging between the electrodes 160A and 160B contain the low resistivity substance having an electrical resistivity lower than that of the ceramic forming the aggregate of the cell walls of the honeycomb unit as aggregate. For example, in the honeycomb structure 100 shown in FIG. 1, the cell walls of the conductive honeycomb contain the low resistivity substance in the entirety of the honeycomb structure 100. Containing the low resistivity substance represents a state in which the low resistivity substance exists in at least some of the cell walls of the honeycomb unit as aggregate.

When such low resistivity substances are arranged adjacent to each other, a high electrical conductivity part is formed. The high electrical conductivity part is formed between the electrodes of the honeycomb structure 110.

The conductive honeycomb is described as an example of the low resistivity substances in which some of the pores of the honeycomb unit having an aggregate made of silicon carbide contain silicon (Si).

Silicon carbide has a high electrical resistivity of about $10^4$ $\Omega$cm at room temperature (for example, at 25° C.), while silicon has a low electrical resistivity of about 1 $\Omega$cm at room temperature (for example, at 25° C.). For example, when voltage is applied by a battery of an automobile to the conductive honeycomb at room temperature (for example, at 25° C.), current hardly flows through silicon carbide forming the aggregate of the honeycomb unit. This is because silicon carbide has a high electrical resistivity and the honeycomb unit has an extremely high electrical resistance value due to its openings and pores. Therefore, when voltage is applied by the battery of an automobile to the conductive honeycomb at room temperature (for example, at 25° C.), electricity flows through only silicon filling in some of the pores. Here, the electrical resistivity of the silicon as a semiconductor is lowered as the temperature of the conductive honeycomb rises. However, the electrical resistivity of the silicon carbide is lowered at the same time. When the electrical resistivity of the silicon carbide is lowered as the temperature rises, current starts flowing through the silicon carbide forming the aggregate of the honeycomb unit at about 300° C. At this time, the electrical resistance value of the conductive honeycomb is a combined resistance value of the electrical resistance value of the silicon carbide forming the aggregate of the honeycomb unit and that of the silicon filling in some of the pores of the cell walls of the honeycomb unit. Accordingly, the electrical resistance value of the conductive honeycomb at high temperature is the combined resistance of the silicon having a low electrical resistivity and the silicon carbide having a high electrical resistivity, thereby making it possible to suppress the temperature dependency of the ceramic and the semiconductor whose electrical resistivity is lowered as the temperature rises.

Particularly, when the low resistivity substance is filling in some of the pores of the cell walls of the honeycomb unit as the electrodes, a length in the longitudinal direction of the high electrical conductivity part can be made large. Therefore, the temperature dependency of a resistance value can be more easily controlled. Filling in with the low resistivity substance represents a state in which the inside of the pores of the cell walls of the honeycomb unit is completely filled with the low resistivity substance. Further, the low resistivity substance may be attached to the front face of the aggregate forming the inner walls of the pores at a predetermined thickness in a state in which spaces remain in the pores of the cell walls of the honeycomb unit.

Here, the low resistivity substance contained in the cell walls, filling in the cell walls or attached to the cell walls at a predetermined thickness is preferably a substance that has high adhesion to the honeycomb unit as aggregate and is stable with respect to exhaust gases. Examples of such a low resistivity substance include silicon (Si), silicide, a mixture of silicon (Si) and silicide, or the like. Examples of silicide include nickel silicide ($Ni_xSi_y$), chrome silicide ($Cr_xSi_y$), iron silicide ($Fe_xSi_y$), or the like.

A method for containing such a low resistivity substance in the cell walls of the honeycomb unit as aggregate is not particularly limited. The low resistivity substance may be contained in the cell walls in such a manner that the pores of the honeycomb unit as aggregate are impregnated with slurry having silicon (Si) and/or silicide and subjected to heat treatment.

A method for containing the low resistivity substance in the cell walls, filling the low resistivity substance in the cell walls, or attaching the same to the cell walls at a predetermined thickness includes changing concentration of the slurry, an impregnation time of the slurry, or the like and applying (impregnation and heat treatment) the low resistivity substance in the cell walls plural times.

If the content of the low resistivity substance contained in the cell walls of the honeycomb unit as aggregate becomes too small, the high electrical conductivity part described above is not formed. Thus, the content of the low resistivity substance contained in the cell walls of the honeycomb unit as aggregate is preferably in the range of about 0.5 wt % through about 30 wt % relative to an amount obtained by subtracting the weight of the low resistivity substance from that of the conductive honeycomb, more preferably in the range of 1.5 wt % through 30 wt %, and still more preferably in the range of about 1.5 wt % through 15 wt %.

When the low resistivity substance is attached to the cell walls at a predetermined thickness, it appears that the ideal thickness of the low resistivity substance is in the range of about 20 nm through about 1000 nm.

Here, when the honeycomb unit as aggregate is made of silicon carbide (SiC), an oxide layer may be formed at the front faces of particles forming the aggregate of the honeycomb unit. With the oxide layer at the front faces of the particles forming the aggregate, flowing of electricity through the aggregate is easily prevented, thereby making it possible to further easily stabilize a resistance value of the conductive honeycomb.

Further, a catalyst may be carried on the conductive honeycomb. The catalyst is preferably platinum, rhodium, or palladium, and preferably carried on the cell walls through an alumina layer. These catalysts act as three-way catalysts that oxidize and reduce HC (hydrocarbon compounds), CO (carbon monoxide), NOx (nitrogen oxide), and the like. With the catalyst carried on the conductive honeycomb, the conductive honeycomb generates heat to thereby enhance conversion performance even where an exhaust gas temperature is lower than a temperature at which the catalyst becomes active.

As described above, in the embodiment of the present invention, the cell walls of the honeycomb unit as aggregate contain the substance having an electrical resistivity smaller than that of the ceramic aggregate forming the cell walls. Therefore, the resistance value of the conductive honeycomb can be easily controlled by adjusting the thickness of the cell walls and the length of the honeycomb unit. Further, the amount of heat generated by the honeycomb unit itself can be controlled by the form factor of the honeycomb unit. Moreover, when the substance having an electrical resistivity smaller than that of the ceramic aggregate is filling in the pores of the cell walls of the honeycomb unit as aggregate, the resistance value of the conductive honeycomb can be controlled by adjusting the filling ratio of the substance in the spaces of the pores of the cell walls of the honeycomb unit. Consequently, the amount of heat generated by the honeycomb unit itself can be controlled. Furthermore, the resistance value of the conductive honeycomb enough for the honeycomb unit to generate heat by itself can be obtained by attaching the substance having an electrical resistivity smaller than that of the aggregate of the honeycomb unit and a predetermined thickness to the front face of the ceramic aggregate forming the cell walls (i.e., the inner walls of the pores) while causing the spaces to remain in the pores of the cell walls of the honeycomb unit as aggregate.

Further, the oxide layer is preferably formed at the front face of the ceramic aggregate. Thus, when ceramic particles having an electrical conducting property are used as the aggregate, flowing of current to the side of the aggregate rather than to the side of the substance having a electrical resistivity smaller than that of the aggregate is prevented, thereby making it possible to easily ensure a sufficient heat generation amount.

(Second Configuration)

The honeycomb structure 100 shown in FIG. 1 is a so-called "integral structure" composed of one conductive honeycomb (honeycomb unit). However, the embodiment of the present invention can also be applied to a honeycomb structure of a so-called "divisional structure" composed of plural conductive honeycomb units.

Figure 3:
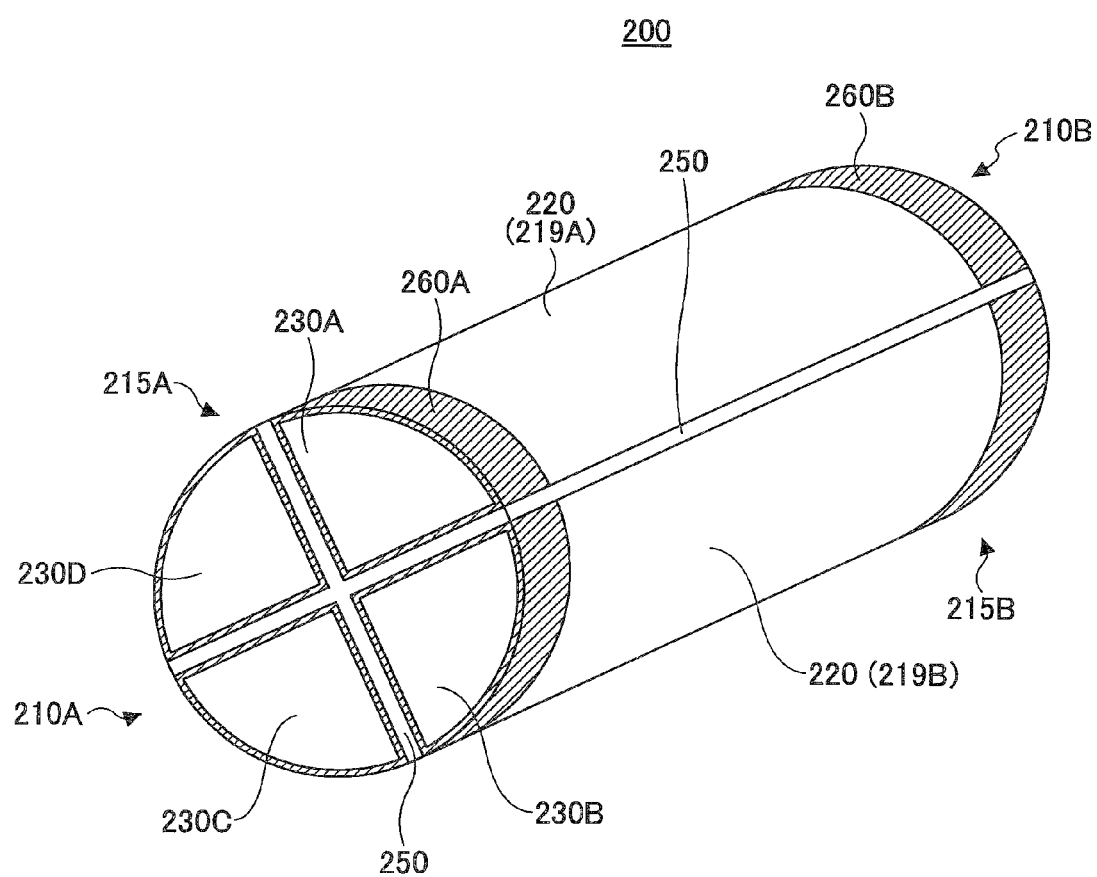
FIG. 3 is a perspective view schematically showing another example of the honeycomb structure according to the embodiment of the present invention.

FIG. 3 shows a honeycomb structure 200 composed of four conductive honeycombs (honeycomb units) according to the embodiment of the present invention. Further, FIG. 4 schematically shows an example of a conductive honeycomb 230A constituting the honeycomb structure 230 shown in FIG. 3.

As shown in FIG. 3, the honeycomb structure 200 is configured by joining the plural conductive honeycombs 230 together by interposing adhesive layers 250. The honeycomb structure 200 is the same as the honeycomb structure 100 shown in FIG. 1 except that it is composed of the plural conductive honeycombs and has electrodes for the respective conductive honeycombs. For example, in an example of FIG. 3, the honeycomb structure 200 is composed of the four conductive honeycombs 230A through 230D.

As shown in FIG. 4, the conductive honeycomb 230A is of a pillar-shaped structure having about ¼-circle substantially fan-shaped end faces 214A and 214B and three lateral faces 217A, 218A, and 219A. Among them, the lateral faces 217A and 218A are substantially-flat rectangular faces, and the lateral face 219A is a curved face (hereinafter referred to as a "curved lateral face"). In the example of FIG. 3, the conductive honeycombs 230B through 230D are substantially the same in shape as the conductive honeycomb 230A. Further, the conductive honeycomb 230A is composed of the conductive honeycomb and a pair of electrodes 260A-1 and 260B-1 formed at all lateral faces on the sides of both end parts of the conductive honeycomb. The conductive honeycomb has the two open end faces 214A and 214B and the lateral face 219A.

The conductive honeycomb 230A has plural cells 222, which extend from the end face 214A to the end face 214B along the longitudinal direction of the conductive honeycomb 230A and are open at both the end faces 214A and 214B, and has cell walls 224 that separate the cells 222 from one another. The conductive honeycomb 230A is made of a material with a substance having high electrical resistivity like, for example, silicon carbide (SiC) as a main ingredient. A catalyst is carried on the cell walls 224 of the conductive honeycomb 230A.

The electrodes 260A-1 and 260B-1 are provided at the peripheries (hereinafter referred to as the "end part 216A" and the "end part 216B") of the end faces 214A and 214B of the conductive honeycomb 230A, respectively. Note that in an example of FIG. 4, the electrodes 260A-1 and 260B-1 are provided over the entire peripheries (i.e., the entirety of the end parts 216A and 216B) of the end parts 216A and 216B of the conductive honeycomb 230A, respectively. The electrodes 260A-1 and 260B-1 may or may not be entirely provided at the end parts 216A and 216B. The electrodes 260A-1 and 260B-1 are only required to be provided at least on the side of the curved lateral face 219A.

Here, like the honeycomb structure 100 shown in FIG. 1, the characteristic of the conductive honeycomb 230A is that the cell walls of the conductive honeycomb 230A ranging between the electrodes 260A-1 and 260B-1 contain a low resistivity substance. For example, in the conductive honeycomb 230A shown in FIG. 4, the cell walls of the conductive honeycomb 230A contain the low resistivity substance having an electrical resistivity lower than that of ceramic forming the aggregate of the cell walls of the honeycomb unit as aggregate in the entirety of the conductive honeycomb 230A. When such low resistivity substances are arranged adjacent to each other, a high electrical conductivity part is formed.

Accordingly, this case can also provide the conductive honeycomb 230A having a resistance value whose temperature dependency is small. Further, when the honeycomb structure 200 is configured by joining the conductive honeycombs 230A through 230D together, a conventional problem can be reduced. In other words, it is possible to easily reduce the problem in which a resistance value is reduced as the temperature of the honeycomb structure further rises and thus becomes inappropriate even if the honeycomb structure has an appropriate resistance value in a temperature range. Further, it is possible to apply relatively appropriate heat in a wide temperature range regardless of the temperature of the honeycomb structure.

Note that the low resistivity substance contained in the pores of the cell walls of the honeycomb unit as aggregate of the conductive honeycomb 230A and a method for applying the low resistivity substance in the cell walls of the honeycomb unit as aggregate are exemplified above. Further, the content of the low resistivity substance contained in the cell walls of the honeycomb unit as aggregate is preferably in the range of about 0.5 wt % through 30 wt %, more preferably in the range of about 1.5 wt % through about 30 wt %, and still more preferably in the range of about 1.5 wt % through about 15 wt % relative to a weight obtained by subtracting the weight of the low resistivity substance from that of the conductive honeycomb 230A (honeycomb unit). Further, the low resistivity substance may fill at least some of the pores of the cell walls of the honeycomb unit as aggregate. Moreover, the low resistivity substance may be attached to the front face of the aggregate forming the inner walls of the pores at a predetermined thickness in a state in which spaces remain in the pores of the cell walls of the honeycomb unit.

It is obvious for those skilled in the art to obtain the effects of the embodiment of the present invention with the honeycomb structure 200 according to this second configuration in the embodiment of the present invention similar to the honeycomb structure 100 according to the first configuration in the embodiment of the present invention described above.

(Details about Honeycomb Structure)

Next, a description is more specifically made of the configuration of respective members constituting the honeycomb structure according to the embodiment of the present invention. Note that in the following description, the members constituting the honeycomb structure 200 of the divisional structure shown in FIG. 3 is mainly described. However, it is obvious for those skilled in the art that a part of the description can also be applied to the honeycomb structure 100 of the integral structure shown in FIG. 1. Further, the respective conductive honeycombs 230A through 230D shown in FIG. 3 are the same in configuration. Therefore, only the conductive honeycomb 230A is taken as an example here, and the configuration of the conductive honeycomb 230A is described.

(Conductive Honeycomb)

A resistance value between the electrodes of the conductive honeycomb 230A is preferably in the range of about 1 through about $10^3 \Omega$ and more preferably in the range of about 10 through about $300 \Omega$ at room temperature (for example, at 25° C.). Thus, even if voltage to be applied between the electrodes 260A-1 and 260B-1 is only voltage of an ordinary battery in, for example, a hybrid vehicle, the honeycomb structure 200 can be adequately heated. Note that if the resistance value of the conductive honeycomb 230A is more than or equal to about $1\Omega$, a sufficient heat generation amount is easily obtained. Further, if the resistance value of the conductive honeycomb 230A is less than or equal to about $10^3 \Omega$, current flowing through the conductive honeycomb 230A is not easily reduced and thus a sufficient heat generation amount can be easily obtained.

A method for containing the low resistivity substance in the cell walls of the honeycomb unit as aggregate of the conductive honeycomb 230A is not particularly limited. For example, when the low resistivity substance is silicon, the low resistivity substance may be contained in the cell walls in such a manner that the conductive honeycomb 230A (honeycomb unit) is impregnated with slurry having silicon and then heat-treated.

The honeycomb unit as aggregate of the conductive honeycomb 230A is mainly made of inorganic materials such as silicon carbide (SiC), aluminum titanate, cordierite, alumina ($Al_2O_3$), silica ($SiO_2$), zirconia ($ZrO_2$), and zeolite. If necessary, a small amount of a resistance adjusting component such as nitrogen (N) and/or aluminum (Al) is further added to the honeycomb unit as aggregate.

The shape of a cross section perpendicular to the longitudinal direction of the conductive honeycomb 230A (honeycomb unit) is not particularly limited, but the cross section may have any shape. The shape of the conductive honeycomb 230A may be a substantially square, a substantially rectangle, a substantially hexagon, or the like.

Further, the shape of a cross section perpendicular to the longitudinal direction of the cells 222 of the conductive honeycomb 230A is not particularly limited, but may be, for example, a substantially triangle and a substantially polygon other than a substantially square.

The cell density of the conductive honeycomb 230A is preferably in the range of about 15.5 through about 186 pieces/$cm^2$ (about 100 to about 1200 cpsi), more preferably in the range of about 31.0 through about 155 pieces/$cm^2$ (about 200 to about 1000 cpsi), and still more preferably in the range of about 46.5 through about 124 pieces/$cm^2$ (about 300 to about 800 cpsi).

The porosity of the conductive honeycomb 230A may be in the range of about 15 through about 50% (the honeycomb unit containing the low resistivity substance).

The thickness of the cell walls 224 of the conductive honeycomb 230A is not particularly limited. However, a lower limit of the thickness is preferably about 0.05 mm from the viewpoint of the strength of the conductive honeycomb, and an upper limit thereof is preferably about 0.3 mm from the viewpoint of the performance of converting the exhaust gas.

The catalyst carried on the cell walls 224 of the conductive honeycomb 230 is not particularly limited, and includes, for example, platinum, rhodium, and palladium. These catalysts may be carried on the cell walls 224 through an alumina layer.

(Adhesive Layers)

The adhesive layers 250 of the honeycomb structure 200 are formed using an adhesive-layer paste as a raw material. The adhesive-layer paste may contain inorganic particles, an inorganic binder, inorganic fibers, and/or an organic binder.

The inorganic particles of the adhesive layer paste are preferably silicon carbide (SiC). As the inorganic binder, inorganic sol, a clay binder, or the like may be used. Specific examples of the inorganic sol include alumina sol, silica sol, titania sol, water glass, or the like. Further, examples of the clay binder include white earth, kaolin, montmorillonite, sepiolite, attapulgite, or the like. These materials may be used singly or used in combination. The material of the inorganic fibers is preferably alumina, silica, silicon carbide, silica alumina, glass, potassium titanate, aluminum borate, or the like. These materials may be used singly or used in combination. Among these materials, silica alumina is preferable.

Further, the organic binder is not particularly limited, but includes one or more kinds selected from the group consisting of polyvinyl alcohol, methyl cellulose, ethyl cellulose, carboxylmethyl cellulose, and the like. Among these materials, carboxymethyl cellulose is preferable as the organic binder.

The thickness of the adhesive layers is preferably in the range of about 0.3 through about 2 mm. If the thickness of the adhesive layers is about more than or equal to 0.3 mm, sufficient bonding strength of the honeycomb units can be easily obtained. On the other hand, if the thickness of the adhesive layers is less than or equal to about 2 mm, a pressure loss of the honeycomb structure hardly becomes large. Note that the number of the conductive honeycombs joined together is appropriately selected in accordance with the size of the honeycomb structure.

(Honeycomb Structure)

The honeycomb structure according to the embodiment of the present invention may have any shape. For example, the shape of the honeycomb structure may be a substantially cylindroid, a substantially square pillar, a substantially polygonal pillar, or the like, other than a substantially cylindrical shown in FIGS. 1 and 3.

In the examples of FIGS. 1 and 3, the electrodes 160A and 160B and the electrodes 260A and 260B are provided at the end parts 115A and 115B and end parts 215A and 215B of the honeycomb structures 100 and 200, respectively. However, the providing positions of the electrodes are not limited to these end parts, but the electrodes may be provided at any positions of the peripheral face of the honeycomb structures (conductive honeycombs).

(Method for Manufacturing Honeycomb Structure)

Next, a description is made of a method for manufacturing the honeycomb structure according to the embodiment of the present invention. Note that in the following description, manufacturing of the honeycomb structure 200 shown in FIG. 3 is taken as an example, but the honeycomb structure 100 shown in FIG. 1 can be manufactured in the same way.

FIG. 5 schematically shows the flow of the method for manufacturing the honeycomb structure according to the embodiment of the present invention. The method for manufacturing the honeycomb structure according to the embodiment of the present invention includes (i) step (S110) in which the honeycomb unit as aggregate is prepared; (ii) step (S120) in which the oxide layer is formed on the aggregate particles of the honeycomb unit as aggregate where necessary, the honeycomb unit as aggregate being silicon carbide; (iii) step (S130) in which the low resistivity substance is contained in the cell walls of the honeycomb unit as aggregate; (iv) step (S140) in which the honeycomb unit as aggregate is heat-treated so that the high electricity conductive part is formed in the cell walls; (v) step (S150) in which the pair of electrodes is provided at the honeycomb unit as aggregate, one of the pair of electrodes being provided at a first part, the other one of the electrodes being provided at a second part; and (vi) step (S160) in which the catalyst is applied on the cell walls of the honeycomb unit as aggregate where necessary.

Note that the low resistivity substance may be filled in the cell walls of the honeycomb unit or attached to the cell walls of the honeycomb unit at a predetermined thickness.

Next, the respective steps are described in detail.

(Step S110)

First, the honeycomb unit as aggregate is prepared as follows.

The material of the honeycomb unit is not particularly limited, but silicon carbide (SiC) is used here as an example. By applying protrusion molding or the like to the raw-material paste that contains silicon carbide (SiC) as a main ingredient, a honeycomb unit molded body is manufactured.

In addition to silicon carbide, an organic binder, a dispersion medium, and a molding auxiliary agent may appropriately be added to the raw material paste. The organic binder is not particularly limited, but includes methyl cellulose, carboxymethyl cellulose, hydroxyethyl cellulose, polyethylene glycol, phenol resin, epoxy resin, or the like. The blending amount of the organic binder is preferably in the range of about 1 through about 10 weight by mass relative to 100 weight by mass of silicon carbide (SiC).

The dispersion medium included in the raw material paste is not particularly limited, but may include water, an organic solvent (such as benzene), and alcohol (such as methanol), or the like. The molding auxiliary agent included in the raw material paste is not particularly limited, but may include ethylene glycol, dextrin, fatty acid, fatty acid soap, polyalcohol, or the like.

The raw material paste is not particularly limited, but is preferably mixed and kneaded. In this case, the raw material paste may be mixed through a mixer, an attritor, or the like, and sufficiently kneaded through a kneader, or the like. A method for molding the raw material paste is not particularly limited, but the raw material paste is preferably molded into a shape having the cells, for example, through extrusion molding.

Then, the honeycomb unit molded body thus obtained is preferably dried. A drying apparatus for drying the molded body is not particularly limited, but includes a microwave drying apparatus, a hot-air drying apparatus, a dielectric drying apparatus, a pressure-reduction drying apparatus, a vacuum drying apparatus, a freeze drying apparatus, or the like. The dried molded body is preferably degreased. Degreasing conditions are not particularly limited and appropriately selected according to the kinds and amounts of organic matter included in the molded body. However, the honeycomb unit molded body is preferably degreased at about 400° C. for about two hours. The honeycomb unit molded body after being dried and degreased is preferably fired. Firing conditions are not particularly limited, but the honeycomb unit molded body is preferably fired at about 2200° C. for about three hours.

In the above step, the honeycomb unit as aggregate can be obtained.

(Step S120)

Next, the oxide film is formed on the aggregate particles of the honeycomb unit as aggregate where necessary.

The oxide film (oxide layer) is formed by heat-treating the honeycomb unit under atmosphere. A temperature at which the oxide film is heat-treated is in the range of about 700° C. through about 1100° C., and a heat treatment time is in the range of about one through about 20 hours.

The formation of the oxide film on the aggregate particles of the honeycomb unit as aggregate prevents current from flowing to the aggregate, thereby making it possible to easily stabilize the resistance value of the conductive honeycomb with respect to a temperature.

(Step S130)

Then, the low resistivity substance is contained in the cell walls of the respective honeycomb units as aggregates.

The low resistivity substance is not particularly limited. For example, when the low resistivity substance is silicon (Si), the raw material of the low resistivity substance may be slurry containing metal silicon. Further, when the low resistivity substance is silicide, the raw material of the low resistivity substance may be a mixture of silicon and transition metal such as nickel (Ni), iron (Fe), and chrome (Cr).

Further, a method for containing the raw material of the low resistivity substance in the cell walls of the honeycomb unit is not particularly limited. For example, when the raw material of the low resistivity substance is silicon (Si), the raw material of the low resistivity substance may be contained in the cell walls of the honeycomb unit by immersing the honeycomb unit in the melt of silicon (Si) or slurry containing silicon (Si). Alternatively, the raw material of the low resistivity substance may be contained in the cell walls of the honeycomb unit by spraying.

(Step S140)

Next, the honeycomb unit as aggregate containing the low resistivity substance is heat-treated. Thus, the low resistivity substance is fixed to the cell walls of the honeycomb unit, and the high electricity conductive part is formed.

A temperature at which the honeycomb unit is heat-treated varies depending on the kind of the raw material of the low resistivity substance. However, when the raw material of the low resistivity substance is silicon (Si), the heat treatment temperature is preferably about 1400° C. On the other hand, when the raw material of the low resistivity substance is a mixture of silicon Si and Ni, the temperature is preferably about 900° C. In this case, silicon (Si) reacts with nickel (Ni) by heat treatment to form silicide. Silicide may be, for example, nickel silicide ($Ni_xSi_y$), chrome silicide ($Cr_xSi_y$), iron silicide ($Fe_xSi_y$), or the like.

Note that if the oxide film is previously formed on the aggregate particles of the honeycomb unit in step S120, the heat treatment in step S140 is preferably performed at a temperature less than or equal to about 1600° C. This is because if this heat treatment is performed at a temperature less than or equal to about 1600° C., the formed oxide film hardly disappears.

(Step S150)

Then, the pair of electrodes are provided at the respective conductive honeycombs. Positions for providing the electrodes are not particularly limited. However, in order to facilitate the attachment of terminals and the application of current, the electrodes are usually provided one at each of the end parts of the conductive honeycomb (honeycomb unit as aggregate) over its entire periphery or at least on the curved face.

The electrodes are generally made of metal. The electrodes are provided at the conductive honeycomb (honeycomb unit as aggregate) by thermal spraying, immersing, or the like.

Note that the provision of the electrodes at the end parts means that the electrodes are provided at regions within a predetermined distance from the end faces on the lateral face of the honeycomb unit.

(Step S160)

Next, the adhesive-layer paste, which will serve as the adhesive layers, is coated on the lateral faces of the conductive honeycomb obtained in the above steps at a uniform thickness, and other conductive honeycombs are successively joined to this conductive honeycomb by interposing the adhesive-layer paste. By repeating this step, a honeycomb structure of a desired size is manufactured.

Then, the honeycomb structure is heated, and the adhesive-layer paste is dried and solidified to thereby form the adhesive layers. Consequently, the conductive honeycombs are fixed to one another.

Next, the catalyst is applied on the cell walls of the respective conductive honeycombs.

Note that the step of applying the catalyst and the step of joining and fixing the conductive honeycombs to one another may be performed in reverse order.

By the above steps, the honeycomb structure 200 shown in FIG. 3 can be manufactured.

Note that the honeycomb structure 100 shown in FIG. 1 can be manufactured using one honeycomb unit (conductive honeycomb) in accordance with steps S110 through S150, without following step S160 in which the conductive honeycombs are joined to one another through the adhesive layers.

EXAMPLES

Next, examples according to the embodiment of the present invention are described.

Example 1

A conductive honeycomb in which a low resistivity substance is contained in pores was manufactured according to the following method, and the temperature variations of resistance values were evaluated.

First, a square-pillar-shaped honeycomb unit as aggregate made of silicon carbide (SiC) (10 mm in height×10 mm in width×50 mm in length) was manufactured according to the method as described above. The porosity of the honeycomb unit including silicon carbide (SiC) as aggregate was 42%.

Then, silicon (Si) slurry was selected as the raw material of the low resistivity substance, and the entire honeycomb unit as aggregate was impregnated with this silicon (Si) slurry. The silicon (Si) additive amount was 1.5 wt % relative to the weight of the honeycomb unit. The honeycomb unit as aggregate containing the silicon (Si) slurry was fired at 1400° C. under inert gas pressure to thereby obtain the conductive honeycomb according to Example 1.

The temperature variation of the resistance value was measured using the conductive honeycomb according to Example 1. The measurement of the temperature variation was performed as follows.

First, silver paste as electrodes was coated on the entire peripheries of both the end parts (10 mm in width) of the conductive honeycomb. That is, the electrodes were formed at an entire lateral face within 10 mm from the end faces of the conductive honeycomb. Further, platinum wires were connected to the respective electrodes.

Next, a constant-voltage power supply unit was connected between the electrodes, and 200 V voltage was applied between the electrodes. The resistance value of the conductive honeycomb was measured in this state. After that, the conductive honeycomb was heated, and the resistance values of the conductive honeycomb were measured similarly at the temperatures of 100° C., 200° C., 300° C., 400° C., and 500° C.

As a result of the measurement, variations of the resistance values of the conductive honeycomb were less than or equal to the order of a two-digit number in the range of 100° C. through 500° C. of the conductive honeycomb.

Example 2

A conductive honeycomb was manufactured according to the same method as Example 1, and the temperature variations of resistance values of the conductive honeycomb were measured in the same manner as Example 1. In Example 2, however, an oxide film was formed on the aggregate particles of a honeycomb unit as aggregate. The oxide film was formed in such a manner that the honeycomb unit as aggregate was held at 1100° C. for 10 hours under atmosphere. Then, the entire honeycomb unit as aggregate on which the oxide film was formed was impregnated with (silicon) Si slurry, and then subjected to heat treatment as in Example 1.

Other conditions were the same as those in Example 1.

As a result of the measurement, in the conductive honeycomb according to Example 2 as well, variations of the resistance values of the conductive honeycomb were less than or equal to the order of a two-digit number in the range of 100° C. through 500° C. of the conductive honeycomb.

Example 3

A honeycomb unit as aggregate was manufactured according to the same method as Example 1, and the temperature variations of resistance values of the conductive honeycomb were measured in the same manner as Example 1. In Example 3, however, the entire honeycomb unit as aggregate was impregnated with $Si_3N_4$ (nickel silicide) slurry as the raw material of a low resistivity substance. The additive amount of $Si_3N_4$ (nickel silicide) was 14 wt % relative to the weight of the honeycomb unit.

Further, in Example 3, the honeycomb unit as aggregate containing the $Si_3N_4$ (nickel silicide) slurry was heat-treated at 2000° C. under an inert gas atmosphere. Other conditions were the same as those in Example 1.

As a result of the measurement, in the conductive honeycomb according to Example 3 as well, variations of the resistance values of the conductive honeycomb were less than or equal to the order of a two-digit number in the range of 100 through 500° C.

Example 4

A conductive honeycomb was manufactured according to the same method as Example 3, and the temperature variations of resistance values of the conductive honeycomb were measured in the same manner as Example 1. In Example 4, however, the additive amount of $Si_3N_4$ (nickel silicide) was 12 wt % relative to the weight of the honeycomb unit. Other conditions were the same as those in Example 3.

As a result of the measurement, in the conductive honeycomb according to Example 4 as well, variations of the resistance values of the conductive honeycomb were less than or equal to the order of a two-digit number in the range of 100 through 500° C.

Example 5

A conductive honeycomb was manufactured according to the same method as Example 3, and the temperature variations of resistance values of the conductive honeycomb were measured in the same manner as Example 1. In Example 5, however, the additive amount of $Si_3N_4$ (nickel silicide) was 30 wt % relative to the weight of the honeycomb unit. Other conditions were the same as those in Example 3.

As a result of the measurement, in the conductive honeycomb according to Example 5 as well, variations of the resistance values of the conductive honeycomb were less than or equal to the order of a two-digit number in the range of 100 through 500° C.

Example 6

A conductive honeycomb was manufactured according to the same method as Example 3, and the temperature variations of resistance values of the conductive honeycomb were measured in the same manner as Example 1. In Example 6, however, the honeycomb unit as aggregate was impregnated with $Si_3Ni_4$ (nickel silicide) slurry, and an oxide film was formed on the aggregate particles of the honeycomb unit as aggregate before the honeycomb unit was heat treated. The oxide film was formed in such a manner that the honeycomb unit was held at 1100° C. for 10 hours under atmosphere. Further, in Example 6, the additive amount of $Si_3Ni_4$ (nickel silicide) was 9 wt % relative to the weight of the honeycomb unit.

Other conditions were the same as those in Example 3.

As a result of the measurement, in the conductive honeycomb according to Example 6 as well, variations of the resistance values of the conductive honeycomb were less than or equal to the order of a two-digit number in the range of 100 through 500° C.

Example 7

A conductive honeycomb was manufactured according to the same method as Example 6, and the temperature variations of resistance values of the conductive honeycomb were measured in the same manner as Example 1. In Example 7, however, an oxide film was formed on the aggregate particles of a honeycomb unit as aggregate. The oxide film was formed in such a manner that the honeycomb unit as aggregate was held at 1100° C. for 10 hours under atmosphere. The porosity of a honeycomb unit as aggregate was 60%.

Other conditions were the same as those in Example 6.

As a result of the measurement, in the conductive honeycomb according to Example 7 as well, variations of the resistance values of the conductive honeycomb were less than or equal to the order of a two-digit number in the range of 100 through 500° C.

Example 8

A conductive honeycomb was manufactured according to the same method as Example 1, and the temperature variations of resistance values were measured in the same manner as Example 1. In Example 8, however, the additive amount of silicon (Si) was 30 wt % relative to the weight of the honeycomb unit. Other conditions were the same as those in Example 1.

As a result of the measurement, in the conductive honeycomb according to Example 8 as well, variations of the resistance values of the conductive honeycomb were less than or equal to the order of a two-digit number in the range of 100° C. through 500° C.

Example 9

A conductive honeycomb was manufactured according to the same method as Example 4, and the temperature variations of resistance values of the conductive honeycomb were measured in the same manner as Example 1. In Example 9, however, the additive amount of $Si_3Ni_4$ (nickel silicide) was 1.5 wt %. Other conditions were the same as those in Example 4.

As a result of the measurement, in the conductive honeycomb according to Example 9 as well, variations of the resistance values of the conductive honeycomb were less than or equal to the order of a two-digit number in the range of 100° C. through 500° C.

Comparative Example 1

A honeycomb unit as aggregate was manufactured according to the same method as Example 1, and the temperature variations of resistance values of the honeycomb unit were measured in the same manner as Example 1. In Comparative Example 1, however, no low resistivity substance was contained in the honeycomb unit as aggregate.

As a result of the measurement, in the case of the honeycomb unit according to Comparative Example 1, it was found that variations of resistance values of the honeycomb unit exceeded the order of a two-digit number in the range of 100 through 500° C., and thus temperature variations of the resistance values of the honeycomb unit were large.

Table 1 collectively shows the porosities of the honeycomb units as aggregates (before containing the low resistivity substances) according to Examples 1 through 9 and Comparative Example 1; the raw materials of the low resistivity substances; methods for adding the low resistivity substances; additive amounts of the low resistivity substances; firing temperatures of the honeycomb unit; presence or absence of forming the oxide film of the particles as aggregate; and the temperature variations of the resistance values of the conductive honeycomb (honeycomb unit).

TABLE 1

|  | POROSITY OF HONEYCOMB UNIT (%) | RAW MATERIAL OF LOW RESISTIVITY SUBSTANCE | ADDITION METHOD OF LOW RESISTIVITY SUBSTANCE | ADDITIVE AMOUNT OF LOW RESISTIVITY SUBSTANCE (wt%) | FIRING TEMPERATURE OF HONEYCOMB UNIT (° C.) | PRESENCE OR ABSENCE OF FORMING OXIDE FILM OF PARTICLE AS AGGRIGATE | TEMPERATURE VARIATION OF RESISTANCE VALUE OF CONDUCTIVE HONEYCOMB (HONEYCOMB UNIT) |
|---|---|---|---|---|---|---|---|
| EXAMPLE 1 | 42 | Si | IMPREGNATION | 1.5 | 1400 | NO | ○ |
| EXAMPLE 2 | 42 | Si | IMPREGNATION | 1.5 | 1400 | YES | ○ |
| EXAMPLE 3 | 42 | $Si_3N_4$ | IMPREGNATION | 14 | 2000 | NO | ○ |
| EXAMPLE 4 | 42 | $Si_3N_4$ | IMPREGNATION | 12 | 2000 | NO | ○ |
| EXAMPLE 5 | 42 | $Si_3N_4$ | IMPREGNATION | 30 | 2000 | NO | ○ |
| EXAMPLE 6 | 42 | $Si_3N_4$ | IMPREGNATION | 9 | 2000 | YES | ○ |
| EXAMPLE 7 | 42 | $Si_3N_4$ | IMPREGNATION | 9 | 2000 | YES | ○ |
| EXAMPLE 8 | 42 | Si | IMPREGNATION | 30 | 1400 | NO | ○ |
| EXAMPLE 9 | 42 | $Si_3N_4$ | IMPREGNATION | 1.5 | 2000 | YES | ○ |
| COMPARATIVE EXAMPLE 1 | 42 | — | — | — | — | — | X |

Note that the temperature variations of the resistance values of the conductive honeycomb (honeycomb unit) were represented as ○ when the variations in the resistance values were less than or equal to the order of a two-digit number in the range of 100 through 500° C., and indicated as X when the variations of the conductive honeycomb (honeycomb unit) exceeded the order of the two-digit number.

As described above, when the low resistivity substances were contained in the cell walls of the honeycomb units, it was confirmed that the dependency of the resistance values on the temperature variations could be easily suppressed.

Obviously, numerous modifications and variations of the present invention are possible in light of the above teachings. It is therefore to be understood that within the scope of the appended claims, the invention may be practiced otherwise than as specifically described herein.

What is claimed is:

1. A honeycomb structure comprising:
   at least one pillar-shaped honeycomb unit comprising:
   an outer peripheral wall; and
   cell walls extending along a longitudinal direction of the honeycomb unit to define cells, the cell walls being composed of a ceramic aggregate having pores, the cell walls containing a substance having an electrical resistivity lower than an electrical resistivity of ceramic thrilling the ceramic aggregate, the substance attaching to a face of the aggregate forming inner walls of the pores in a state in which the pores remain, the ceramic comprising silicon carbide; and
   a pair of electrodes arranged at the cell walls and/or the outer peripheral wall.

2. The honeycomb structure according to claim 1, wherein the substance having the electrical resistivity lower than the electrical resistivity of the ceramic funning the aggregate fills at least some of the pores.

3. The honeycomb structure according to claim 1, wherein the substance having the electrical resistivity lower than the electrical resistivity of the ceramic forming the aggregate comprises silicon, silicide, or a mixture of silicon and silicide.

4. The honeycomb structure according to claim 3, wherein the silicide comprises nickel silicide, chrome silicide, or iron silicide.

5. The honeycomb structure according to claim 1, wherein the substance having the electrical resistivity lower than the electrical resistivity of the ceramic forming the aggregate is contained in a range of about 0.5 wt % through about 30 wt % relative to a weight obtained by subtracting a weight of the substance having the electrical resistivity lower than the electrical resistivity of the ceramic from a weight of the honeycomb unit.

6. The honeycomb structure according to claim 5, wherein the substance having the electrical resistivity lower than the electrical resistivity of the ceramic forming the aggregate is contained in a range of about 1.5 wt % through about 30 wt % relative to the weight obtained by subtracting the weight of the substance having the electrical resistivity lower than the electrical resistivity of the ceramic from the weight of the honeycomb unit.

7. The honeycomb structure according to claim 6, wherein the substance having the electrical resistivity lower than the electrical resistivity of the ceramic forming the aggregate is contained in a range of about 1.5 wt % through about 15 wt % relative to the weight obtained by subtracting the weight of the substance having the electrical resistivity lower than the electrical resistivity of the ceramic from the weight of the honeycomb unit.

8. The honeycomb structure according to claim 1, wherein
an oxide layer is provided at a front face of the aggregate having the pores, and
the substance having the electrical resistivity lower than the electrical resistivity of the ceramic forming the aggregate attaches to a front face of the oxide layer.

9. The honeycomb structure according to claim 1, wherein a catalyst is carried on the cell walls.

10. The honeycomb structure according to claim 9, wherein
the catalyst is any one of platinum, rhodium, and palladium and carried on the cell walls through an alumina.

11. The honeycomb structure according to claim 1, wherein
the at least one honeycomb unit has a plurality of honeycomb units, and
the plurality of honeycomb units are joined together by interposing adhesive layers.

12. The honeycomb structure according to claim 1, wherein
the substance having the electrical resistivity lower than the electrical resistivity of the ceramic is contained between the electrodes in the honeycomb unit.

13. The honeycomb structure according to claim 1, wherein
an oxide layer is provided at a front face of the ceramic aggregate.

14. The honeycomb structure according to claim 1, wherein
the honeycomb unit as the aggregate is made of silicon carbide.

15. The honeycomb structure according to claim 1, wherein
the at least one honeycomb unit has one honeycomb unit, and
the honeycomb structure is composed of the one honeycomb unit.

16. The honeycomb structure according to claim 1, wherein
the at least one honeycomb unit has four honeycomb units, and
the honeycomb structure is composed of the four honeycomb units, each of the honeycomb units having a pillar-shaped structure including to first end face and a second end face opposite to the first end face in the longitudinal direction, the pillar-shaped structure including three lateral faces between the first end face and the second end face, each of the first end face and the second end face having about ¼-circle substantially fan-shape.

17. The honeycomb structure according to claim 1, wherein
the electrodes are made of metal.

18. The honeycomb structure according to claim 1, wherein
the electrodes are provided by metal spraying, metal sputtering, or metal vapor deposition.

19. The honeycomb structure according to claim 1, wherein
the honeycomb unit includes a first end part and a second end part opposite to the first end part in the longitudinal direction, and
the electrodes are provided at the first end part and the second end part, respectively.

20. The honeycomb structure according to claim 1, wherein
the honeycomb unit includes a first end face and a second end face opposite to the first end face in the longitudinal direction, and
the electrodes are provided at all over the first end face and the second end face, respectively.

21. The honeycomb structure according to claim 1, wherein
the electrodes are provided at least on a side of a curved face of the outer peripheral wall.

22. The honeycomb structure according to claim 1, wherein
a resistance value between the electrodes in the honeycomb unit is in a range of about $1\Omega$ through about $10^3\Omega$ at room temperature.

23. The honeycomb structure according to claim 22, wherein
the resistance value between the electrodes in the honeycomb unit is in a range of about $10\Omega$ through about $300\Omega$ at room temperature.

24. The honeycomb structure according to claim 1, wherein
the honeycomb unit is made of silicon carbide, aluminum titanate, cordierite, alumina, silica, zirconia, or zeolite.

25. The honeycomb structure according to claim 1, wherein
nitrogen and/or aluminum is added to the aggregate.

26. The honeycomb structure according to claim 1, wherein
a cell density of the honeycomb unit is in a range of about 15.5 through about 186 pieces/cm$^2$.

27. The honeycomb structure according to claim 1, wherein
a porosity of the honeycomb unit containing the substance having the electrical resistivity lower than the electrical resistivity of the ceramic is in a range of about 15 through about 50%.

28. The honeycomb structure according to claim 1, wherein
a lower limit of a thickness of the cell walls is about 0.05 mm and an upper limit thereof is about 0.3 mm.

29. The honeycomb structure according to claim 1, wherein
the ceramic forming the ceramic aggregate is not electrically conductive at room temperature and is electrically conductive at about 300° C.

* * * * *